(12) United States Patent
Liu et al.

(10) Patent No.: US 10,206,236 B2
(45) Date of Patent: Feb. 12, 2019

(54) DEVICE AND METHOD FOR ANTENNA SYNCHRONIZATION AND SELECTION

(71) Applicant: APPLE INC., Cupertino, CA (US)

(72) Inventors: Hsin-Yuo Liu, Fremont, CA (US); Ruben Caballero, San Jose, CA (US); Mohit Narang, San Jose, CA (US); Peter M. Agboh, San Francisco, CA (US); Paul V. Flynn, Menlo Park, CA (US); Qiong Wu, Cupertino, CA (US); Nicholas M. McDonnell, Cupertino, CA (US); Navid Damji, Cupertino, CA (US); Ming Hu, Sunnyvale, CA (US); Wen Zhao, San Jose, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 15/391,953

(22) Filed: Dec. 28, 2016

(65) Prior Publication Data

US 2017/0111947 A1 Apr. 20, 2017

Related U.S. Application Data

(63) Continuation of application No. 14/732,105, filed on Jun. 5, 2015, now Pat. No. 9,544,934.

(51) Int. Cl.
*H04B 7/00* (2006.01)
*H04W 76/14* (2018.01)
*H04W 4/80* (2018.01)

(52) U.S. Cl.
CPC ............. *H04W 76/14* (2018.02); *H04W 4/80* (2018.02)

(58) Field of Classification Search
CPC ....... H04W 84/18; H04W 88/06; H04W 4/80; H04W 76/14; H04M 1/72577;
(Continued)

(56) References Cited

U.S. PATENT DOCUMENTS 7,623,879 B2 * 11/2009 Honkanen ............ H04B 1/1027
370/310
7,800,553 B2 9/2010 Konaka
(Continued)

FOREIGN PATENT DOCUMENTS

CN 1765065 4/2006
CN 103620970 3/2014
(Continued)

*Primary Examiner* — Nhan T Le
(74) *Attorney, Agent, or Firm* — Fay Kaplun & Marcin, LLP (57) ABSTRACT

A device and method selects an antenna configuration. The method performed at a user equipment includes determining at least one communication functionality that is being used, each communication functionality configured to utilize at least one antenna in a multi-antenna arrangement of the user equipment. The method includes receiving a first indication of whether a cellular communication functionality is being used, the cellular communication functionality configured to utilize at least one antenna in the multi-antenna arrangement. The method includes receiving a second indication of whether a coexistence condition is present. The method includes determining an antenna configuration for the multi-antenna arrangement to be used by the determined communication functionality based upon the determined communication functionality, the first indication, and the second indication. The method includes configuring the multi-antenna arrangement for the determined communication functionality based upon the antenna configuration.

20 Claims, 5 Drawing Sheets

(58) Field of Classification Search
CPC .......... H04M 1/72519; H04M 2250/06; H01Q 1/243; H01Q 1/2291
See application file for complete search history.

(56) References Cited

U.S. PATENT DOCUMENTS

| | | | |
|---|---|---|---|
| 2012/0329395 A1 | 12/2012 | Husted et al. | |
| 2013/0187807 A1* | 7/2013 | Peng ................. | H01Q 3/24 342/175 |
| 2015/0103758 A1* | 4/2015 | Wang ................ | H04W 72/0426 370/329 |
| 2015/0133185 A1* | 5/2015 | Chen ................. | H04W 72/1215 455/552.1 |
| 2016/0301456 A1 | 10/2016 | Clevorn et al. | |

FOREIGN PATENT DOCUMENTS

| | | |
|---|---|---|
| CN | 104185230 | 12/2014 |
| CN | 104362439 | 2/2015 |

\* cited by examiner

Fig. 1

Selection Table 180

| Use Case | Problem | BT | WiFi Core 1 | WiFi Core 0 | Decision | BT-WiFi FW Actions |
|---|---|---|---|---|---|---|
| Bluetooth | Select Best Antenna | WF2/WF5 | | | Set BT Antenna (Auto) | BT Rx based on SNR & Rx Errors<br>BT Tx based on SNR & Max Tx Power |
| Bluetooth + Cell (non-Coex) | SAR | WF2/WF5 | | | Set BT Antenna (Auto)<br>WCI2 Type 7 Enabled | (same as above)<br>+ BT Cell-ON Tx Power Cap per Antenna |
| Bluetooth + Cell (Coex) | Coex & SAR | WF2 | | | Set BT Antenna (WF2)<br>WCI2 Type 7 Enabled | BT fixed on WF2<br>+ BT Cell-ON Tx Power Cap on WF2 |
| 2.4 GHz WiFi | Select Best Antenna | - | WF1 | WF2/WF5 | Set WiFi Antenna (Core 0: Auto) | WiFi Rx based on SNR & Rx Errors<br>WiFi Tx based on SNR & Max Tx Power |
| 2.4 GHz WiFi + Cell (non-Coex) | SAR | - | WF1 | WF2/WF5 | Set WiFi Antenna (Core 0: Auto)<br>WCI2 Type 7 Enabled | (same as above)<br>+ WiFi Cell-ON Tx Power Cap per Antenna |
| 2.4 GHz WiFi + Cell (Coex) | Coex & SAR | - | WF1 | WF2 | Set WiFi Antenna (Core 0: WF2)<br>WCI2 Type 7 Enabled | BT & WiFi Core 0 fixed on WF2<br>+ WiFi Cell-ON Tx Power Cap on WF2 |
| Bluetooth + 2.4 GHz WiFi | Select Best Antenna | WF2/WF5 | WF1 | WF2/WF5 | Set BT Antenna (Auto)<br>Set WiFi Antenna (Core 0: Auto) | WiFi Rx based on SNR & Rx Errors<br>WiFi Tx based on SNR & Max Tx Power |
| BT + 2.4 GHz WiFi + Cell (non-Coex) | SAR | WF2/WF5 | WF1 | WF2/WF5 | Set BT Antenna (Auto)<br>Set WiFi Antenna (Core 0: Auto)<br>WCI2 Type 7 Enabled | (same as above)<br>+ WiFi & BT Cell-ON Tx Power Cap per Antenna |
| BT + 2.4 GHz WiFi + Cell (Coex) | Coex & SAR | WF2 | WF1 | WF2 | Set BT Antenna (WF2)<br>Set WiFi Antenna (Core 0: WF2)<br>WCI2 Type 7 Enabled | BT & WiFi Core 0 fixed on WF2<br>+ WiFi & BT Cell-ON Tx Power Cap on WF2 |
| BT + 5G WiFi | Select Best Antenna | WF2/WF5 | WF1 | WF2 | Select BT Antenna (Auto)<br>Set WiFi Antenna (Core 0: Auto) | BT Rx based on SNR & Rx Errors<br>BT Tx based on SNR & Max Tx Power |
| BT + 5G WiFi + Cell (non-Coex) | SAR | WF2/WF5 | WF1 | WF2 | Select BT Antenna (Auto)<br>Set WiFi Antenna (Core 0: WF2)<br>WCI2 Type 7 Enabled | (same as above)<br>+ WiFi & BT Cell-ON Tx Power Cap per Antenna |
| BT + 5G WiFi + Cell (Coex) | Coex & SAR | WF2 | WF1 | WF2 | Select BT Antenna (WF2)<br>Set WiFi Antenna (Core 0: WF2)<br>WCI2 Type 7 Enabled | BT & WiFi Core 0 fixed on WF2<br>+ WiFi & BT Cell-ON Tx Power Cap per Antenna |

DEVICE AND METHOD FOR ANTENNA SYNCHRONIZATION AND SELECTION

BACKGROUND INFORMATION

A user equipment (UE) may include a communication component to establish a connection to one or more further components either through a direct connection or through a communications network. More specifically, the communication component may enable wireless communications. For example, the communication component may be a radio including one or more communication chips such as a WiFi chip, a Bluetooth chip, a cellular chip, etc. The communication chips may be configured to operate on different frequencies or channels as defined in a specification of the corresponding communication technology.

The UE may further include an antenna arrangement that is utilized by the communication chips to transmit and receive signals on the corresponding frequencies. The antenna arrangement may include a plurality of antennas for use by the different communication chips. One of the communication chips may utilize one or more of the antennas in the antenna arrangement for transmission diversity and/or reception diversity. At a concurrent time, another one of the communication chips may utilize one or more of the antennas in the antenna arrangement also for transmission diversity and/or reception diversity. Conventional approaches in antenna selection to achieve the diversity entails each communication chip independently selecting the antennas for use without consideration of other communication chips being used. For example, each communication chip may have a respective algorithm to dynamically select the transmission antenna based on performance characteristics.

When multiple communication chips operate concurrently and utilize antennas in the antenna arrangement, there may be adverse effects that result. For example, the use of antennas by multiple communication chips may result in an elevated specific absorption rate (SAR) condition. The SAR condition may be intended to be minimized for any number of a variety of reasons. In another example, the cellular chip may also entail a coexistence condition to be present. The coexistence condition may also negatively affect the manner in which the communication chips perform from an out of band emission, blocking, intermodulation distortion, etc.

SUMMARY

The present invention describes a method performed at a user equipment comprising: determining at least one communication functionality that is being used, each of the at least one communication functionality configured to utilize at least one antenna in a multi-antenna arrangement of the user equipment; receiving a first indication of whether a cellular communication functionality is being used, the cellular communication functionality configured to utilize at least one antenna in the multi-antenna arrangement; receiving a second indication of whether a coexistence condition is present; determining an antenna configuration for the multi-antenna arrangement to be used by the determined at least one communication functionality based upon the determined at least one communication functionality, the first indication, and the second indication; and configuring the multi-antenna arrangement for the determined at least one communication functionality based upon the antenna configuration.

The present invention describes a user equipment comprising: a multi-antenna arrangement; a cellular radio configured to establish a connection to a cellular network via the multi-antenna arrangement; a radio configured to at least one of establish a connection to a WiFi network using a WiFi communication functionality and establish a short-range connection to a further user equipment using a Bluetooth communication functionality via the multi-antenna arrangement, the radio configured to select an antenna configuration for the multi-antenna arrangement by: determining whether at least one of the WiFi communication functionality and the Bluetooth communication functionality is being used; receiving a first indication of whether the cellular radio is being used; receiving a second indication of whether a coexistence condition is present; determining the antenna configuration of at least one antenna in the multi-antenna arrangement to be used by the determined at least one of the WiFi communication functionality and the Bluetooth communication functionality based upon the determined at least one of the WiFi communication functionality and the Bluetooth communication functionality, the first indication, and the second indication; and configuring the multi-antenna arrangement for the determined at least one of the WiFi communication functionality and the Bluetooth communication functionality based upon the antenna configuration.

The present invention describes a non-transitory computer readable storage medium with an executable program stored thereon, wherein the program instructs a microprocessor to perform operations, comprising: determining at least one communication functionality that is being used, each of the at least one communication functionality configured to utilize at least one antenna in a multi-antenna arrangement of the user equipment; receiving a first indication of whether a cellular communication functionality is being used, the cellular communication functionality configured to utilize at least one antenna in the multi-antenna arrangement; receiving a second indication of whether a coexistence condition is present; determining an antenna configuration for the multi-antenna arrangement to be used by the determined at least one communication functionality based upon the determined at least one communication functionality, the first indication, and the second indication; and configuring the multi-antenna arrangement for the determined at least one communication functionality based upon the antenna configuration.

BRIEF DESCRIPTION OF THE DRAWINGS

FIG. 2 shows an exemplary selection table according to various embodiments described herein.

DETAILED DESCRIPTION

The exemplary embodiments may be further understood with reference to the following description and the related appended drawings, wherein like elements are provided with the same reference numerals. The exemplary embodiments are related to a device and method for antenna synchronization and selection in a radio utilizing more than one communication chip and an antenna arrangement comprising more than one antenna. The antenna selection of the plurality of antenna in the antenna arrangement may be selected based upon a selection table given parameters of a current scenario being experienced by the communication chips in the radio. Specifically, based upon an existing condition of the communication chips including a specific absorption rate (SAR) condition and a coexistence condition, the exemplary embodiments provide a mechanism by which the selection table is utilized to minimize the adverse effects associated with either or both conditions. Accordingly, the exemplary embodiments may enable the use of the radio and the antenna arrangement in an efficient manner.

Figure 1:
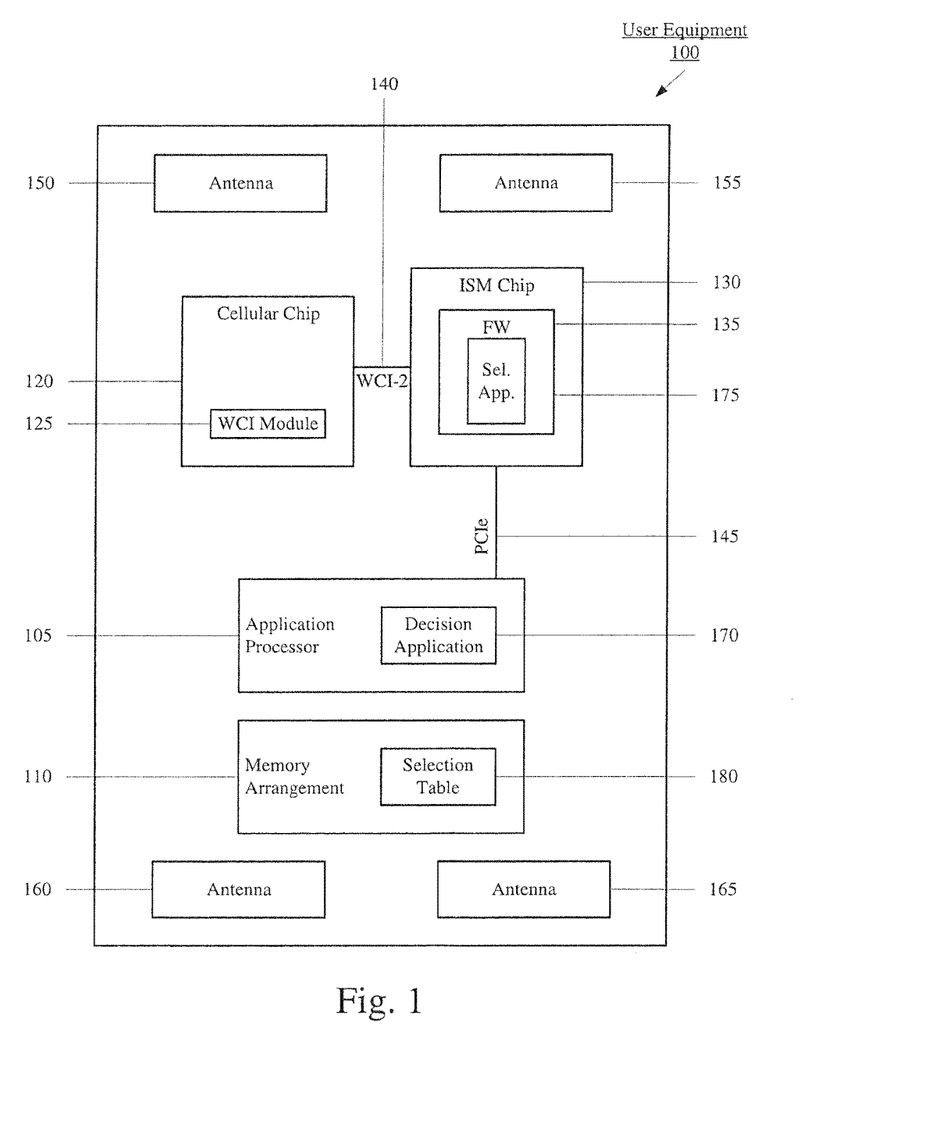
FIG. 1 shows components of an exemplary user equipment configured to select an antenna configuration according to various embodiments described herein.

FIG. 1 shows components of an exemplary user equipment (UE) 100 configured to select an antenna configuration according to various embodiments described herein. The UE 100 may represent any electronic device configured to establish a communicative link with another UE or a network. That is, the UE 100 includes components corresponding to the various frequencies and wireless communications in which wireless communications are to be performed. Accordingly, the UE 100 is configured to enable coexistence between multiple wireless technologies within a single device. The UE 100 may represent any electronic device such as a portable device (e.g., a cellular phone, a smartphone, a tablet, a phablet, a laptop, a wearable, etc.) or a stationary device (e.g., desktop computer). The UE 100 may include an application processor 105, a memory arrangement 110, a cellular chip 120, an Industrial, Scientific, and Medical (ISM) chip 130, and an antenna arrangement including a plurality of antenna 150-165.

The applications processor 105 may be configured to execute a plurality of applications of the station 100. For example, the applications may include a web browser when connected to a communication network via the cellular chip 120 and/or the ISM chip 130. In another example, the applications may include a short range exchange program with another UE via the ISM chip 130. The memory arrangement 110 may be a hardware component configured to store data related to operations performed by the UE 100. Specifically, as will be described in further detail below, the memory arrangement 110 may store a selection table 180 that defines the antenna configuration to be used. It should be noted that the selection table 180 may also be stored in other components of the UE 100 such as in firmware executed by an integrated circuit. The UE 100 may include further components (not shown) such as a display device, an input/output (I/O) device, a portable power supply (e.g., battery), a data acquisition device, ports to electrically connect the UE 100 to other electronic devices via wired communications, etc.

The cellular chip 120 and the ISM chip 130 may be a hardware components configured to transmit and/or receive data. That is, the cellular chip 120 and the ISM chip 130 may enable communication with other electronic devices directly or indirectly through a network based upon an operating frequency of the direct communication pathway or network. The cellular chip 120 and the ISM chip 130 may operate on a variety of different frequencies or channels (e.g., set of consecutive frequencies) that are related to a cellular network and a WiFi network, respectively. The ISM chip 130 may also perform wireless functionalities for short range communications such as Bluetooth. Accordingly, the cellular chip 120 may be for the wireless functionalities related to the cellular network and the ISM chip 130 may be for the wireless functionalities related to the WiFi network and the Bluetooth communications. It should be noted that the chips may also be referred to as a radio or a multi-radio arrangement in which the cellular chip 120 may represent a cellular radio and the ISM chip 130 may represent an ISM radio including a WiFi radio and a Bluetooth radio. It should further be noted that the cellular chip 120 and the ISM chip 130 may include any combination of hardware, software, firmware, etc. necessary for the respective functionalities to be performed such as a processing functionality.

As discussed above, the cellular chip 120 and the ISM chip 130 may operate on a variety of different frequencies or channels. The cellular chip 120 may provide the functionalities such that the wireless functionalities related to the cellular network may be performed. The cellular chip 120 may more specifically enable the UE 100 to communicate wirelessly with a cellular network operating in any of the bands used by cellphones, including, but not limited to, cellphone bands adjacent to the ISM band. The ISM chip 130 may provide the functionalities such that the wireless functionalities related to the WiFi network and/or the short range communications may be performed. The ISM chip 130 may more specifically enable the UE 100 to communicate wirelessly with a WiFi network operating in any of implemented bands such as in the 2.4 GHz band or the 5 GHz band in addition to enabling the UE 100 to communicate wirelessly with another UE in the Bluetooth band such as between 2.4 GHz and 2.485 GHz. Those skilled in the art will understand that the ISM chip 130 may be provided for the WiFi network but may be adjusted such that the ISM chip 130 is also provided for the short range communications as the WiFi network and the short range communications operate in a high-band frequency range. However, it should be noted that the use of the ISM chip 130 as an incorporated component for WiFi and Bluetooth is only exemplary. In another exemplary embodiment, the ISM chip 130 may represent separate chips, one for WiFi and one for Bluetooth.

The components of the station 100 may be disposed at least partially on an integrated circuit board (ICB). Accordingly, the cellular chip 120, the ISM chip 130, and the applications processor 105 may be disposed on the ICB in which pathways may also exist between these components. For example, there may be a cellular pathway (not shown) to connect the cellular chip 120 to the applications processor 105. In another example, there may be an ISM pathway such as a peripheral component interconnect express (PCIe) 145 to connect the ISM chip 130 to the applications processor 105. In a further example, there may be a wireless coexistence interface (WCI) pathway 140 such as WCI-2 to connect the cellular chip 120 to the ISM chip 130. Those skilled in the art will understand the manner in which the cellular chip 120, the ISM chip 130, and the applications processor 105 may be disposed on the ICB as well as the manner in which the different pathways may be provided for the interconnections. Therefore, the pathways provide an exemplary manner for data or information to be exchanged between the components of the cellular chip 120, the ISM chip 130, and the applications processor 105.

As described above, the applications processor 105 may be used for the different applications that may be executed on the UE 100. The applications processor 105 may also be configured to control high-level actions between the cellular chip 120 and the ISM chip 130. Although the WCI pathway 140 may be used, the WCI pathway 140 may be limited to a size of the types of messages that may be transmitted between the cellular chip 120 and the ISM chip 130. For example, as will be described in further detail below, the cellular chip 120 may transmit a Type 7 message, the contents of which may indicate information related to the cellular chip 120. The applications processor 105 may provide a bridge for a large data block to be transmitted between the cellular chip 120 and the ISM chip 130. The applications processor 105 may also be configured to provide indications such as a state of the UE 100 (e.g., when it is awake, when it is going asleep, when it is waking, etc.). According to the exemplary embodiments, the applications processor 105 may further be configured to execute a decision application 170. The decision application 170 may generate a message to indicate a decision table to be used. For example, the message may be transmitted as an input/output control (ioctl) over the PCIe 145 which may be any system call to a device. Specifically, the decision table may be provided to the ISM chip 130 to provide at least a partial basis upon which an antenna configuration is selected when a coexistence condition is present or absent. The decision table may be provided based upon a variety of factors such as a cellular channel, a WiFi channel, a Bluetooth operation, etc.

According to the exemplary embodiments, the ISM chip 130 may be configured with firmware (FW) 135 that may include a selection application 175 to determine an antenna configuration to be used based upon the selection table 180 by utilizing the ioctl received from the decision application 170 over the PCIe 145 and the Type 7 message received from the cellular chip 120 over the WCI pathway 140. As will be described in further detail below, the ioctl and the Type 7 message may be configured to provide information regarding the coexistence condition and the cellular chip functionality, respectively, that forms the basis upon which the selection table 180 is to be used. The antenna configuration may accordingly be selected such that the antennas 150-165 are used according to the selection from the selection table 180 that optimizes the performance of the cellular chip 120 and the ISM chip 130 given the current communications operations. It should be noted that the selection table 180 may be generated based upon experimental data from trials performed to determine a preferred antenna configuration based upon various communication settings.

The WCI pathway 140 is designed for the transmission of real-time messages between the cellular chip 120 and the ISM chip 130. The WCI pathway 140 has been designed by the Bluetooth Special Interest Group (SIG) such that a specified data packet is utilized for the real-time message. Specifically, a Universal Asynchronous Receiver/Transmitter (UART) message may be used with the WCI pathway 140. The Bluetooth SIG has designed the WCI pathway 140 to utilize the UART message in a specialized manner. Specifically, eight different message types may be used where a group of message types are denoted as Type X to include message types 0, 1, and 3-7.

As discussed above, the exemplary embodiments may utilize the Type 7 message to be transmitted from the cellular chip 120 to the ISM chip 130 over the WCI pathway 140. As those skilled in the art will understand, the Type 7 message may include five indicators (e.g., I[0], I[1], . . . , and I[4]) or components in which information may be transmitted.

Specifically, with regard to the exemplary embodiments, the I[0] may include an indicator (e.g., a Boolean) of whether the cellular chip 120 or cellular communications are on or off such as a radio resource control (RRC) connected indicator (RRC_C). The I[1] may include an indication regarding a power level which the cellular chip may be operating. As those skilled in the art will understand, the power level may be selected based upon a power cap as defined by standards and specifications in the telecommunications industry. According to the exemplary embodiments, the I[2] may include an indication of a portion or selection in the selection table 180 to be used in selecting the antenna configuration. The remaining I[3] and I[4] may be blank (e.g., zero'ed out) or may be used for other purposes. The Type 7 message may have the indicators determined based upon a WCI module 125 which may represent a module configured for this functionality.

The ioctl according to the exemplary embodiments may include information used to determine the antenna configuration to be used. In a first example, the ioctl may be for independent antenna selection instructions for the 2.4 GHz band and the 5 GHz band. In a second example, the ioctl may be for simultaneous antenna selection for the 2.4 GHz band and the 5 GHz band. In a third example, the ioctl may be for independent antenna selection instructions for uplink and downlink. In a fourth example, the ioctl may be configured for antennas that are allowed for use as well as selecting specific antennas within this allowed set (e.g., by the FW 135). In a fifth example, the ioctl may be for a multiple-input multiple-output (MIMO) configuration of up to 3×3 and for up to four antennas such as the antennas 150-165. However, it should be noted that although the description of the exemplary embodiments herein are associated with these conditions, they are only exemplary. As those skilled in the art will understand, different conditions may also be used, particularly those relating to those noted above.

According to the exemplary embodiments and given the above conditions, the antenna selection ioctl from the decision application 170 executed by the applications processor 105 may include various types of information for use by the selection application 175. In a first example, the ioctl may include a preset amount of information (e.g., two bits, two bytes, etc.) for each combination of WiFi band (e.g., 2.4 GHz and 5 GHz) and an antenna selection table (e.g., as indicated in I[2] of the Type 7 message). Thus, the two byte information may be for 2.4 GHz with a first antenna selection table, 2.4 GHz with a second antenna selection table, 5 GHz with the first antenna selection table, and 5 GHz with the second antenna selection table. The ioctl may also include an uplink antenna mode byte, a two byte uplink antenna selection, and a bitmap of allowed uplink antennas. Specifically, the uplink antenna mode byte may indicate whether a default may be used or whether constraints are to be applied. The two byte uplink antenna selection may indicate whether specific antennas are to be selected, whether one antenna is selected from an allowed set, whether two antennas are selected from the allowed set, and whether three antennas are selected from the allowed set. The bitmap of allowed uplink antennas may include the four antennas 150-165. The ioctl may further include a downlink antenna mode byte, a two byte downlink antenna selection, and a bitmap of allowed downlink antennas. The information for this portion of the ioctl may be substantially similar to that for the uplink except corresponding to the downlink.

It was described above that there may be power caps associated with the antenna selection. It is again noted that the ISM chip 130 may operate in consideration of a power cap that is set for the Bluetooth portion and/or the WiFi portion of the ISM chip 130 based upon the antenna and cellular state. The power cap may be any predetermined or dynamic selection such that standards such as those related to SAR are followed. Therefore, the description below for the antenna selection may also incorporate a power cap if the power cap is also a setting associated or accompanied with the antenna selection such as being indicated in the Type 7 message in I[1]. It is also noted that the power cap may be different for each selection in the antenna configuration or a constant power cap value may be used.

The exemplary embodiments provide a mechanism to make a selection in the selection table 180 to determine an antenna configuration to be used by the cellular chip 120 and/or the ISM chip 130 based upon current communications conditions of the UE 100. It was described above that the UE 100 may include an antenna arrangement in which a plurality of antennas 150-165 are included. The antennas 150-165 may be any type of antenna that is capable of being used by the cellular chip 120 and the ISM chip 130 and the subcomponents corresponding to the various communications technologies that are available. The antennas 150-165 may also be disposed in the UE 100 at predetermined locations to achieve different types of diversities. For example, the antennas 150, 155 may be disposed on a common side while the antennas 160, 165 may be disposed on an opposite side of the UE 100. Therefore, the antennas 150, 155 may be relatively far away from the antennas 160, 165 whereas the antenna 150 may be closer to the antenna 155 and the antenna 160 may be closer to the antenna 165. The proximity and disposition of the antennas 150-165 may potentially contribute to the SAR and coexistence conditions of the UE 100. The antennas 150-165 may also be predetermined for operation with particular communication technologies available on the cellular chip 120 and the ISM chip 130. However, it should be noted that the antennas 150-165 may also be available for each communication technology and not limited to select ones. It should also be noted that the disposition and number of the antennas 150-165 is only exemplary and those skilled in the art will understand that the exemplary embodiments may also be applied to UEs having different dispositions and/or numbers of the antennas in the antenna arrangement.

In a more specific exemplary embodiment, the antennas 150-165 may be any type of antenna configured to be used for the various communication functionalities when selected. Accordingly, the antenna 150 (referred to as WF5 in FIG. 2) may be configured for performing communications corresponding to cellular diversity, 2.4 GHz for WiFi communications, and 2.4 GHz for Bluetooth communications. The antenna 155 may be configured for performing communications corresponding to a cellular primary. The antenna 160 (referred to as WF1 in FIG. 2) may be configured for performing communications corresponding to 2.4 GHz for WiFi communications and 5 GHz for WiFi communications. The antenna 165 (referred to as WF2 in FIG. 2) may be configured for performing communications corresponding to 2.4 GHz for WiFi communications and 5 GHz for WiFi communications and 2.4 GHz for Bluetooth communications. It should be noted that the designation of the antennas for the select communication technologies is only exemplary. Those skilled in the art will understand that the antennas 150-165 may have different selections for each of the antennas 150-165 for the available communications technologies.

In view of these select operations for each of the antennas 150-165, there may be circuitry or connections (not shown) between the antennas 150-165, the cellular chip 120 and the ISM chip 130. As discussed above, the cellular chip 120 and the ISM chip 130 thereof may be disposed on an ICB. More specifically, the cellular chip 120 may be housed as a separate cellular radio whereas the ISM chip 130 may be housed as a separate WiFi radio including a first core for the WiFi operations and a second core including a first portion for the 2.4 GHz communications and a second portion for the 5 GHz communications. Thus, the cellular radio may have a connection to the antenna 150 and the antenna 155. It is noted that the first and second cores may be used for spatially multiplexed transmissions or diversity transmissions. The first core of the WiFi radio may have a connection to the antenna 160. The first portion of the second core of the WiFi radio may have a connection to the cellular radio for further connection to the antenna 150 and a connection to the antenna 165. The second portion of the second core of the WiFi radio may have a connection to the antenna 165. In view of the first and second portions of the second core having multiple connections, the first portion may have a first switch that enables a particular connection pathway to operate and the second portion may have a second switch that enables a further particular connection pathway to operate. The switches may be controlled by the FW 135 that generates the appropriate signals.

As discussed above, the exemplary embodiments may utilize the selection table 180 to make a selection to determine an antenna configuration to be used by the cellular chip 120 and the ISM chip 130. Specifically, the selection for the antenna configuration may be predetermined uses of select ones of the antennas 150-165 based upon the communications settings being used prior to using the antenna configuration that is determined by the selecting application 175.

FIG. 2 shows the selection table 180 stored in the memory arrangement 110 according to various embodiments described herein. Specifically, the selection table 180 relates to the selecting application 175 receiving the ioctl from the decision application 170 over the PCIe 145 and the Type 7 message from the cellular chip 120 such as generated by the WCI module 125 over the WCI pathway 140. The selection table 180 presents the possible different use cases based upon the cellular chip 120 and the ISM chip 130 which further enables WiFi and Bluetooth communications. The selection table 180 further identifies the problems that may be present from the different use cases, the available antennas for use, and actions to be taken for the given use case when identified.

The use cases that may be included in the selection table 180 may be divided into whether the Bluetooth functionality of the ISM chip 130 is being utilized, which of the WiFi functionalities of the ISM chip 130 is being utilized, and whether the cellular functionality of the cellular chip 120 is being utilized. The cellular functionality may further be subdivided into whether the use of the cellular functionality results in a coexistence condition. Again, as described above, this may be determined based upon the Type 7 message received by the selecting application 175 executed by the FW 135 on the ISM chip 130. Thus, a first division in the selection table 180 is when the Bluetooth functionality is being used and the WiFi functionality is not being used in either the 2.4 GHz or the 5 GHz. The first division also provides the scenarios where the cellular functionality is also being used and the coexistence condition is determined to be absent or present. A second division in the selection table 180 is when the 2.4 GHz WiFi functionality is being used and the Bluetooth functionality is not being used. The second division also provides the scenarios where the cellular functionality is also being used and the coexistence condition is determined to be absent or present. A third division in the selection table 180 is when the Bluetooth functionality is being used and the 2.4 GHz WiFi functionality is being concurrently used. The third division also provides the scenarios where the cellular functionality is also being used and the coexistence condition is determined to be absent or present. A fourth division in the selection table 180 is when the Bluetooth functionality is being used and the 5 GHz WiFi functionality is being concurrently used. The fourth division also provides the scenarios where the cellular functionality is also being used and the coexistence condition is determined to be absent or present. Each division will be described below.

The first division of the selection table 180 provides selections when the Bluetooth functionality is being used alone, with the cellular functionality with no coexistence condition, and with the cellular functionality with the coexistence condition. When the Bluetooth functionality is being used alone, there may not be a SAR or coexistence issue associated with this communication setting. Accordingly, this may correspond to the first row of the selection table 180. The Bluetooth functionality is also usable with the antenna 150 or the antenna 165. With no associated problem, the selecting application 175 may select a best antenna for use as indicated in the selection table 180 corresponding to an auto selection. Thus, the auto selection may relate to a corresponding action of setting the Bluetooth antenna based upon a network parameter such as a signal-to-noise ratio (SNR). The selection of the antenna may incorporate a selection for receiving on Bluetooth based upon calculated receiving errors and a selection for transmitting on Bluetooth based upon a maximum transmission power.

When the Bluetooth functionality is being used with the cellular functionality, there may entail either a specific absorption rate (SAR) condition or a combination of a SAR condition and a coexistence condition. With only the SAR condition, this may correspond to the second row of the selection table 180. Again, the Bluetooth functionality is usable with the antenna 150 or the antenna 165. When the cellular functionality is being used, the antenna 155 may be used. With no coexistence condition, the selecting application 175 may again select a best antenna for use as indicated in the selection table 180 corresponding to an auto selection. Specifically, a substantially similar auto selection process may be used as discussed above (e.g., based upon SNR, receiving errors, maximum transmission power, etc.). Furthermore, with the cellular functionality being used, the WCI module 125 may generate the Type 7 message for transmission over the WCI pathway 140 as this feature is enabled. A corresponding action may be to set the Bluetooth antenna in a substantially similar operation discussed above where only the Bluetooth functionality is being used (with no cellular functionality). Furthermore, the selecting application 175 may set a power cap to address the SAR condition for each the antenna being used by the cellular chip 120 and the ISM chip 130.

With the combination of the SAR condition and the coexistence condition, this may correspond to the third row of the selection table 180. By also detecting the coexistence condition, the Bluetooth functionality may be determined to only be usable with the antenna 165. For example, the antenna 150 may no longer be a viable option as the proximity to the antenna 155 being used by the cellular chip 120 may be the cause of the coexistence condition that degrades the performance of the cellular chip 120 and the ISM chip 130. Therefore, although the antenna 150 or the antenna 165 is otherwise available for the Bluetooth functionality, the selection table 180 may indicate that the Bluetooth functionality is to be performed via the antenna 165 only. The Bluetooth may again select the antenna 165 but with consideration of the limitation being imposed to result in selecting the antenna 165. The presence of the coexistence condition may be performed in a substantially similar operation described above except that an opposite determination is found. Furthermore, with the cellular functionality being used, the WCI module 125 may generate the Type 7 message for transmission over the WCI pathway 140 as this feature is enabled. A corresponding action may be to set the Bluetooth antenna as indicated in the selection table 180 and set a power cap to address the SAR condition and/or the coexistence condition for the antenna 165. It should be noted that this power cap may be substantially similar to the previously discussed power cap that addressed the SAR condition. However, this power cap may also be a different value and these power caps may be part of a power control configuration. Accordingly, the power cap may additionally be categorized and/or set using different factors such as whether there is a SAR condition, whether there is a coexistence condition, whether there is both the SAR condition and the coexistence condition, which antennas 150-165 are being utilized, a combination thereof, etc.

The second division of the selection table 180 provides selections when the 2.4 GHz WiFi functionality is being used alone, with the cellular functionality with no coexistence condition, and with the cellular functionality with the coexistence condition. When the 2.4 GHz WiFi functionality is being used alone, there may not be any problem associated with this communication setting. Accordingly, this may correspond to the fourth row of the selection table 180. The 2.4 GHz WiFi functionality is also usable with the antenna 150, the antenna 160, or the antenna 165 based upon the core of the ISM chip 130. With no associated problem, the selecting application 175 may select a best antenna for use as indicated in the selection table 180 corresponding to an auto selection. Specifically, for the first core, the antenna 160 may be selected and for the first portion of the second core, the antenna 150 or the antenna 165 may be selected. With no associated problem, the selecting application 175 may select a best antenna for use by the second core of the ISM chip 130 as indicated in the selection table 180 corresponding to an auto selection. Thus, a corresponding action may be to set the 2.4 GHz WiFi antenna based upon the network parameter. In a substantially similar manner as the Bluetooth only setting described above, the selection of the antenna may incorporate a selection for receiving on 2.4 GHz WiFi based upon calculated receiving errors and a selection for transmitting on 2.4 GHz WiFi based upon a maximum transmission power.

When the 2.4 GHz WiFi functionality is being used with the cellular functionality, there may entail either a SAR condition or a combination of a SAR condition and a coexistence condition. With only the SAR condition, this may correspond to the fifth row of the selection table 180. Again, the 2.4 GHz WiFi functionality is usable with the antenna 160 with the first core or the antenna 150 or the antenna 165 with the first portion of the second core. When the cellular functionality is being used, the antenna 155 may be used. The absence of the coexistence condition may be determined in a substantially similar manner discussed above. With no coexistence condition, the selecting application 175 may again select a best antenna for use by the second core of the ISM chip 130 as indicated in the selection table 180 corresponding to an auto selection. Furthermore, with the cellular functionality being used, the WCI module 125 may generate the Type 7 message for transmission over the WCI pathway 140 as this feature is enabled. A corresponding action may be to set the 2.4 GHz WiFi antenna in a substantially similar operation discussed above where only the 2.4 GHz WiFi functionality is being used (with no cellular functionality). Furthermore, the selecting application 175 may set a power cap for each the antenna being used by the cellular chip 120 and the ISM chip 130.

With the combination of the SAR condition and the coexistence condition, this may correspond to the sixth row of the selection table 180. By also detecting the coexistence condition, the 2.4 GHz WiFi functionality may be determined to only be usable with the antenna 160 for the first core and the antenna 165 for the first portion of the second core. For example, the antenna 150 may no longer be a viable option as the proximity to the antenna 155 being used by the cellular chip 120 may be the cause of the coexistence condition that degrades the performance of the cellular chip 120 and the ISM chip 130. The selection table 180 may thereby indicate that the 2.4 GHz WiFi functionality is to be performed by the first portion of the second core via the antenna 165 only. The 2.4 GHz WiFi functionality may again select the antenna 165 but with consideration of the limitation being imposed to result in selecting the antenna 165. The presence of the coexistence condition may be performed in a substantially similar operation described above except that an opposite determination is found. Furthermore, with the cellular functionality being used, the WCI module 125 may generate the Type 7 message for transmission over the WCI pathway 140 as this feature is enabled. A corresponding action may be to set the 2.4 GHz WiFi antenna as indicated in the selection table 180 and set a power cap for the antenna 165.

The third division of the selection table 180 provides selections when the Bluetooth functionality and the 2.4 GHz WiFi functionality is being used in combination, with the cellular functionality with no coexistence condition, and with the cellular functionality with the coexistence condition. When the Bluetooth functionality and the 2.4 GHz WiFi functionality are being used in combination, there may not be any problem associated with this communication setting. Accordingly, this may correspond to the seventh row of the selection table 180. As discussed above, the Bluetooth functionality is usable with the antenna 150 or the antenna 165 by the second core of the ISM chip 130 while the 2.4 GHz WiFi functionality is usable with the antenna 160 by the first core of the ISM chip 130 or with the antenna 150 or the antenna 165 by the second core of the ISM chip 130. With no associated problem, the selecting application 175 may select a best antenna for use as indicated in the selection table 180 corresponding to an auto selection for both the Bluetooth antenna and the 2.4 GHz WiFi antenna on the second core of the ISM chip 130. However, since both the Bluetooth antenna and the 2.4 GHz WiFi antenna may both be selected from either the antenna 150 or the antenna 165, the auto selection may relate to one of these functionalities selecting one of these antennas while the other functionality selects the remaining antenna. For example, should the Bluetooth functionality select the antenna 150, the 2.4 GHz WiFi functionality may select the antenna 165 to maintain a diversity. However, this may only be one determination as the selecting application 175 may also determine that a common antenna to be used by both functionalities may be more optimal based upon the current conditions. With no associated problem, the selecting application 175 may select a best antenna for use by each functionality as indicated in the selection table 180 corresponding to an auto selection where the selection may be based upon the network parameter. In a substantially similar manner as the Bluetooth only setting described above, the selection of the 2.4 GHz WiFi antenna may incorporate a selection for receiving on 2.4 GHz WiFi based upon calculated receiving errors and a selection for transmitting on 2.4 GHz WiFi based upon a maximum transmission power.

When the Bluetooth functionality and the 2.4 GHz WiFi functionality are being used with the cellular functionality, there may entail either a SAR condition or a combination of a SAR condition and a coexistence condition. With only the SAR condition, this may correspond to the eighth row of the selection table 180. Again, the Bluetooth functionality is usable with the antenna 150 or the antenna 165 while the 2.4 GHz WiFi functionality is usable with the antenna 160 with the first core or the antenna 150 or the antenna 165 with the first portion of the second core. When the cellular functionality is being used, the antenna 155 may be used. The absence of the coexistence condition may be determined in a substantially similar manner discussed above. With no coexistence condition, the selecting application 175 may again select a best antenna for use by the Bluetooth portion and the 2.4 GHz WiFi portion of the ISM chip 130 in a substantially similar manner as discussed above with no cellular functionality. Furthermore, with the cellular functionality being used, the WCI module 125 may generate the Type 7 message for transmission over the WCI pathway 140 as this feature is enabled. A corresponding action may be to set the Bluetooth antenna and the 2.4 GHz WiFi antenna in a substantially similar operation discussed above. Furthermore, the selecting application 175 may set a power cap for each the antenna being used by the cellular chip 120 and the ISM chip 130.

With the combination of the SAR condition and the coexistence condition, this may correspond to the ninth row of the selection table 180. By also detecting the coexistence condition, the Bluetooth functionality and the 2.4 GHz WiFi functionality may be determined to each only be usable with the antenna 165. For example, the antenna 150 may no longer be a viable option as the proximity to the antenna 155 being used by the cellular chip 120 may be the cause of the coexistence condition that degrades the performance of the cellular chip 120 and the ISM chip 130. The selection table 180 may thereby indicate that the 2.4 GHz WiFi functionality is to be performed by the first portion of the second core via the antenna 165 only. The 2.4 GHz WiFi functionality may again select the antenna 165 but with consideration of the limitation being imposed to result in selecting the antenna 165. The presence of the coexistence condition may be performed in a substantially similar operation described above except that an opposite determination is found. Furthermore, with the cellular functionality being used, the WCI module 125 may generate the Type 7 message for transmission over the WCI pathway 140 as this feature is enabled. A corresponding action may be to set the Bluetooth WiFi antenna and the 2.4 GHz WiFi antenna as indicated in the selection table 180 and set a power cap for the antenna 165.

The fourth division of the selection table 180 provides selections when the Bluetooth functionality and the 5 GHz WiFi functionality is being used in combination, with the cellular functionality with no coexistence condition, and with the cellular functionality with the coexistence condition. When the Bluetooth functionality and the 5 GHz WiFi functionality are being used in combination, there may not be any problem associated with this communication setting. Accordingly, this may correspond to the tenth row of the selection table 180. As discussed above, the Bluetooth functionality is usable with the antenna 150 or the antenna 165 by the second core of the ISM chip 130 while the 5 GHz WiFi functionality is usable with the antenna 160 by the first core of the ISM chip 130 or with the antenna 165 by the second portion of the second core of the ISM chip 130. With no associated problem, the selecting application 175 may select a best antenna for use as indicated in the selection table 180 corresponding to an auto selection for both the Bluetooth antenna and the 5 GHz WiFi antenna on the second core of the ISM chip 130. The selection by both functionalities may be substantially similar to that described above with regard to the Bluetooth functionality and the 2.4 GHz WiFi functionality. With no associated problem, the selecting application 175 may select a best antenna for use by each functionality as indicated in the selection table 180 corresponding to an auto selection where the selection may be based upon the network parameter. In a substantially similar manner as the Bluetooth only setting described above, the selection of the Bluetooth WiFi antenna may incorporate a selection for receiving on Bluetooth based upon calculated receiving errors and a selection for transmitting on Bluetooth based upon a maximum transmission power.

When the Bluetooth functionality and the 5 GHz WiFi functionality are being used with the cellular functionality, there may entail either a SAR condition or a combination of a SAR condition and a coexistence condition. With only the SAR condition, this may correspond to the eleventh row of the selection table 180. Again, the Bluetooth functionality is usable with the antenna 150 or the antenna 165 while the 5 GHz WiFi functionality is usable with the antenna 160 with the first core or the antenna 165 with the second portion of the second core. When the cellular functionality is being used, the antenna 155 may be used. The absence of the coexistence condition may be determined in a substantially similar manner discussed above. With no coexistence condition, the selecting application 175 may again select a best antenna for use by the Bluetooth portion and the 5 GHz WiFi portion of the ISM chip 130 in a substantially similar manner as discussed above with no cellular functionality. Furthermore, with the cellular functionality being used, the WCI module 125 may generate the Type 7 message for transmission over the WCI pathway 140 as this feature is enabled. A corresponding action may be to set the Bluetooth antenna and the 5 GHz WiFi antenna in a substantially similar operation discussed above. Furthermore, the selecting application 175 may set a power cap for each the antenna being used by the cellular chip 120 and the ISM chip 130.

With the combination of the SAR condition and the coexistence condition, this may correspond to the twelfth row of the selection table 180. By also detecting the coexistence condition, the Bluetooth functionality and the 5 GHz WiFi functionality may be determined to each only be usable with the antenna 165. Accordingly, a substantially similar analysis and operation may be performed as discussed above with the ninth row of the selection table 180.

Figure 3:
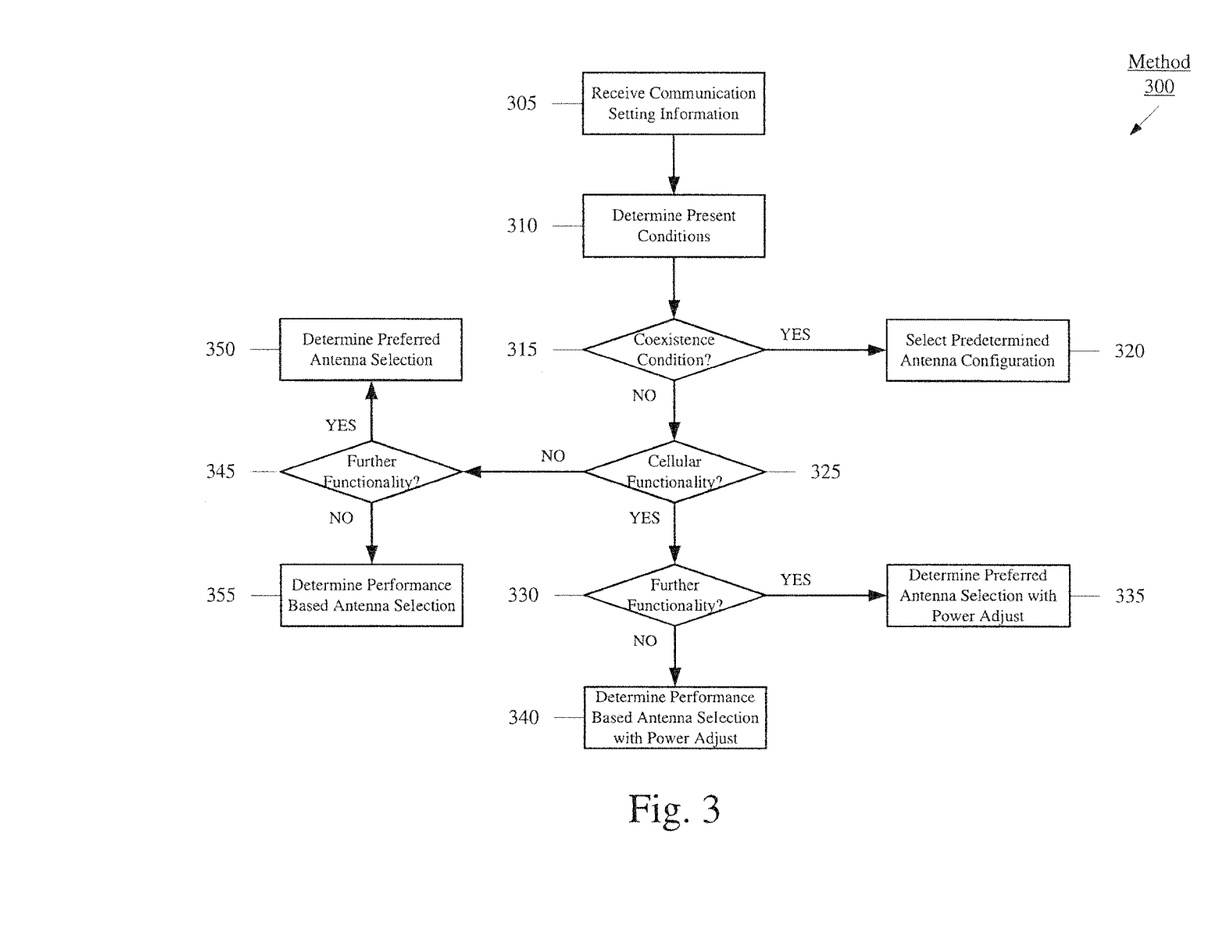
FIG. 3 shows an exemplary method for selecting an antenna for a communication functionality according to various embodiments described herein.

FIG. 3 shows an exemplary method 300 for selecting an antenna for a communication functionality according to various embodiments described herein. Specifically, the method 300 may relate to determining an antenna configuration to be used by the cellular chip 120 and the ISM chip 130 based upon which of the communication functionalities are being used such as the cellular functionality, the Bluetooth functionality, and the WiFi functionality. The method 300 also relates to determining the existence of conditions that also affect the antenna configuration to be used. Accordingly, the method 300 relates to the selection table 180. The method 300 will be described with regard to the UE 100 of FIG. 1 and the selection table 180 of FIG. 2.

In 305, the ISM chip 130 may receive the communication setting information. As discussed above, the ISM chip 130 may include the FW 135 that executes the selecting application 175. To perform its functionality, the cellular chip 120 via the WCI module 125 may generate and transmit the Type 7 message related to the cellular functionality while the decision application 170 executed by the applications processor 105 may generate and transmit the ioctl related to the conditions experienced by the UE 100. Thus, in 310, the ISM chip 130 may determine the present conditions.

In 315, the ISM chip 130 determines whether there is a coexistence condition. The coexistence condition may exist when at least one of the Bluetooth functionality, the 2.4 GHz WiFi functionality, and the 5 GHz WiFi functionality operate while the cellular functionality is also being used. Accordingly, this may be associated with rows three, six, nine, and twelve on the selection table 180. When the coexistence condition exists, the selection table 180 may define the antenna configuration to be selected such that the performance of the cellular chip 120 and the ISM chip 130 is maximized under the present conditions. Thus, when there is a coexistence condition, the ISM chip 130 continues the method 300 to 320 where the predetermined antenna configuration as indicated in the selection table 180 is selected.

Returning to 315, when there is no coexistence condition, the ISM chip 130 continues the method to 325. In 325, the ISM chip 130 determines whether the cellular functionality is being used. As discussed above, the cellular functionality may be indicated specifically via the Type 7 message. The use of the cellular functionality may entail a SAR condition being present. That is, when the cellular functionality is being used while at least one of the Bluetooth functionality, the 2.4 GHz WiFi functionality, and the 5 GHz WiFi functionality is being used, the SAR condition may arise. Accordingly, this may be associated with rows two, five, eight, and eleven on the selection table 180.

In 330, the ISM chip 130 determines whether there is a further functionality being used. For example, the Bluetooth functionality may be used alone, the 2.4 GHz WiFi functionality may be used alone, the Bluetooth functionality may be used with the 2.4 GHz WiFi functionality, and the Bluetooth functionality may be used with the 5 GHz WiFi functionality. Accordingly, the ISM chip 130 may be used for an individual communication functionality or a combination communication functionality. If a combination communication functionality is being used, the ISM chip 130 continues the method 300 to 335. Specifically, this may be associated with rows eight and eleven of the selection table 180. In 335, the ISM chip 130 selects the antenna configuration based upon a preference as indicated in the selection table 180. In addition, the preference may also be selected at least partially upon performance. As discussed above, the selection may be based on the performance and receiving errors for a receiving aspect of the communication functionality and a maximum transmission power of the transmitting aspect. In another manner, the receiving aspect may make the selection on performance while the transmitting aspect may make the selection on a previous receiving antenna that was used. Furthermore, an appropriate power adjust such as applying a power cap may be used from the selection. For example, when the Bluetooth functionality is used with the 2.4 GHz WiFi functionality along with the cellular functionality and no coexistence condition exists, the Bluetooth functionality may have an antenna selected based upon a preference from the available antennas 150, 165. The 2.4 GHz functionality may also have an antenna selected based upon a preference in which the first portion of the second core has an available antenna 160 and the second portion of the second core has available antennas 150, 165. In another example, when the Bluetooth functionality is used with the 5 GHz WiFi functionality along with the cellular functionality and no coexistence condition exists, the Bluetooth functionality may again have an antenna selected based upon a preference from the available antennas 150, 165. The 5 GHz functionality may also have an antenna selected based upon a preference (although more limited) in which the first portion of the second core has an available antenna 160 and the second portion of the second core has an available antenna 165. Once the antenna selection is performed and the antenna configuration is determined, the ISM chip 130 may generate signals to operate the appropriate switches to achieve the antenna configuration.

Returning to 330, if a single communication functionality on the ISM chip 130 is being used, the ISM chip 130 continues the method 300 to 340. Specifically, this may correspond to rows two and five of the selection table 180. In 340, the ISM chip 130 selects the antenna configuration based upon a performance basis. Furthermore, an appropriate power adjust such as applying a power cap may be used from the selection. Again, as was discussed above, the receiving and transmitting aspects of the communication functionality may be selected on receiving errors, maximum transmitting power, performance, prior receiving antenna, etc. For example, when the Bluetooth functionality is used along with the cellular functionality and no coexistence condition exists, the Bluetooth functionality may have an antenna selected based upon a performance such as a SNR. Other performance metrics may include a received signal strength indicator (RSSI), a link quality (LQ), etc. Accordingly, the available antennas 150, 165 for the Bluetooth functionality may be selected on this basis. In another example, when the 2.4 GHz WiFi functionality is used along with the cellular functionality and no coexistence condition exists, the 2.4 GHz WiFi functionality may have an antenna selected based upon performance. Accordingly, the available antenna 160 for the first core and the available antennas 150, 165 for the second core may be selected on this basis.

Returning to 325, the Type 7 message may indicate that the cellular functionality is not being used or is inactive while at least one of the Bluetooth functionality, the 2.4 GHz WiFi functionality, and the 5 GHz WiFi functionality is being used such that no condition arises. Accordingly, this may be associated with rows one, four, seven, and ten on the selection table 180. In 345-355, a substantially similar analysis may be performed by the ISM chip 130. However, the power adjust may not be present from the selection for the antenna configuration.

It should be noted that the diversity to be achieved for the Bluetooth functionality and the WiFi functionality may include several features. For example, with WiFi diversity, this may be limited to the 2.4 GHz WiFi functionality since the 5 GHz WiFi functionality may be restricted in antenna selection. The diversity decision may be based upon the performance including the SNR, power, transmit failures, receiving activity, timeouts, etc. The SNR may be updated periodically by polling non-active antennas. The diversity may also be activated when the SNR threshold is below 25. In another example, with Bluetooth diversity, this may be limited to classic Bluetooth. The diversity decision may be based upon the performance including the RSSI, packet errors, timeouts, etc. The Bluetooth antenna may have a default for an initial connection setup.

The exemplary embodiments further provide a mechanism to address when the coexistence condition is present. Specifically, the selection table 180 may include further antenna configurations to define a manner in which the antennas are to be used for transmitting and receiving purposes. Accordingly, the selecting application 175 may further receive information regarding a current antenna configuration including transmitting and/or receiving characteristics and determine an antenna configuration to be used that details how each antenna is to be used. Accordingly, a first communication functionality may be considered a "master" or a preferred functionality that may first determine an antenna selection. An antenna selection for a second communication functionality may be dynamically switched based upon the decision of the first communication functionality. In a substantially similar manner, these selections may be based upon further definitions indicated in the selection table. This mechanism will be described with regard to further use cases.

Figure 4:
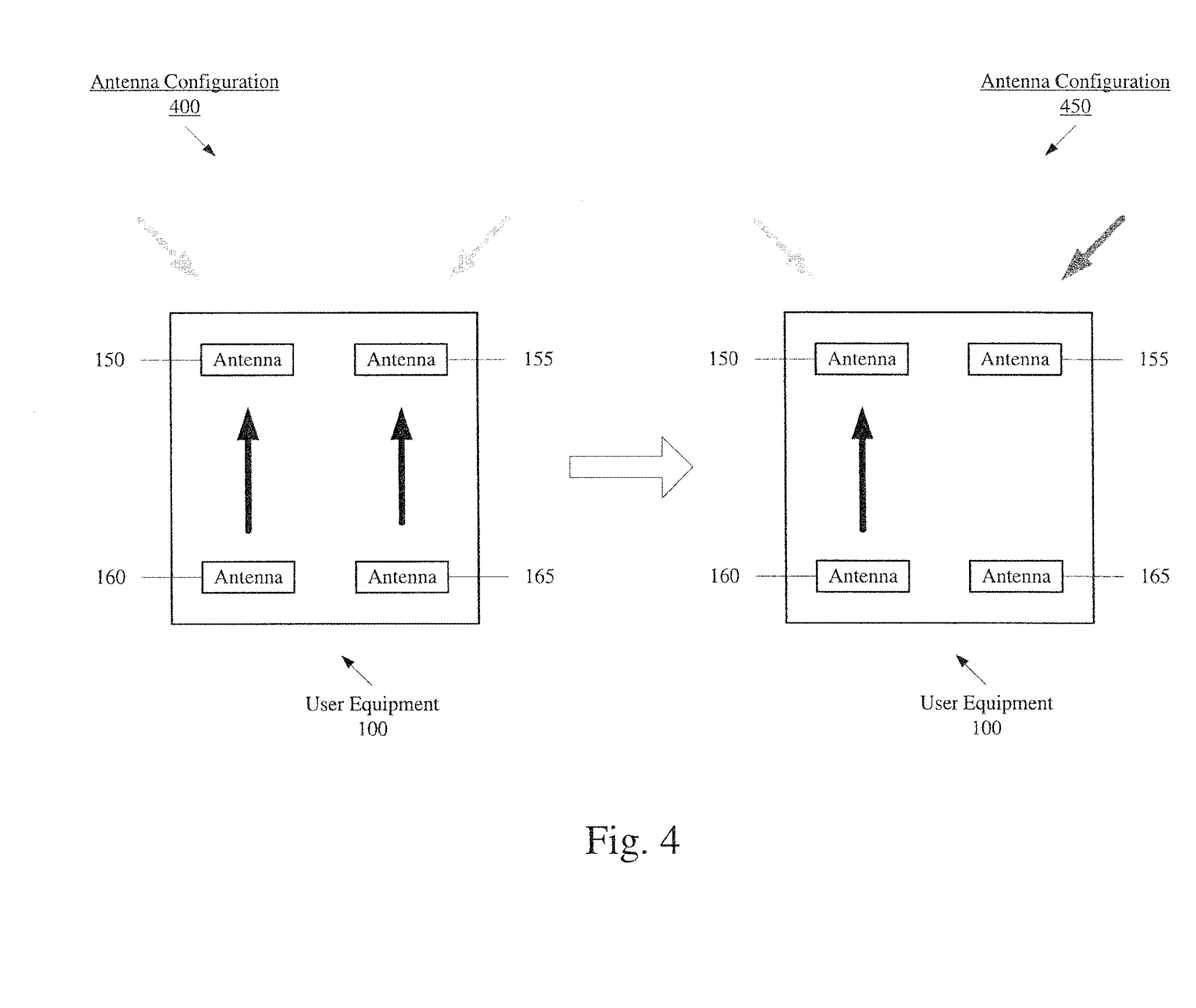
FIG. 4 shows an exemplary antenna configuration from a selection in the selection table according to various embodiments described herein.

FIG. 4 shows an exemplary antenna configuration from a selection in the selection table 180 according to various embodiments described herein. Specifically, FIG. 4 illustrates a first antenna configuration 400 that represents a first type of antenna configuration that is being used by the UE 100. FIG. 4 further illustrates a second antenna configuration 450 that represents a second type of antenna configuration to be used by the UE 100 after the determination for this antenna configuration is made.

The first antenna configuration 400 is shown on the UE 100 and the antennas 150-165 that are substantially similar in positioning as was described above. However, as this mechanism relates to the transmission and reception configuration of the antennas 150-165, the use case for FIG. 4 illustrates where a first communication functionality affects a second communication functionality when the first communication functionality utilizes a two-antenna transmission that impacts both receiving antennas of the second communication functionality while the first and second communication functionalities operate simultaneously. The degradation in performance may be caused by harmonic fall in-band, out of band emission fall in band, blocking, etc. As illustrated, the antennas 160, 165 may be antennas used in the two-antenna transmission of the first communication functionality while the antennas 150, 155 may be the receiving antennas of the second communication functionality.

Given this basis, the selecting application 175 may utilize the selection table 180 and determine a change to be made to this current antenna configuration to improve the performance of the communication functionalities such that the coexistence condition may be minimized. The selection table 180 may indicate that the change includes the first communication functionality altering from the two-antenna transmission to a one-antenna transmission to dynamically switch based upon the indication determined by the selection table 180. Thus, the antenna configuration 450 may illustrate the result from the change being implemented. That is, the antenna 160 remains being used for transmission while the antenna 165 is no longer being used. The antenna 150 may still be affected by the coexistence issue but the antenna 155 may no longer be affected and have an increased performance.

Several further use cases (not shown) will be described herein. The use cases may also relate to different antenna configurations. For example, there may be a different number of antennas than what is illustrated in the UE 100. However, to more accurately define the use cases, the orientation and positioning of the antennas as illustrated for the UE 100 are maintained. For example, when the UE has only three antennas, the positioning may substantially correspond to those described for the antennas 150-165.

In a second use case, the UE may include three antennas. Specifically, the antennas may correspond to the antennas 150-160 of the UE 100. Accordingly, a first antenna may correspond to the positioning of the antenna 150, a second antenna may correspond to the positioning of the antenna 155, and the third antenna may correspond to the antenna 160. In the second use case, a first communication functionality may utilize a two-antenna transmission while a second communication functionality may utilize a one-antenna transmission. This transmission configuration may impact both the receiving antennas of the second communication functionality. Accordingly, an intermodulation distortion (IMD) may result. However, it should be noted that the IMD is only exemplary and is used herein to represent any problem in the various scenarios which may also include harmonics, out of band, etc. The two-antenna transmission of the first communication functionality may be performed by the antennas 155, 160 while the antenna 155 is also being used by the one-antenna transmission of the second communication functionality. The antennas 150, 155 may be used as the receiving antennas of the second communication functionality.

Given this basis, the selecting application 175 may utilize the selection table 180 and determine a change to be made to this current antenna configuration to improve the performance of the communication functionalities such that the coexistence condition may be minimized. The selection table 180 may indicate that the change includes the first communication functionality altering from the two-antenna transmission to a one-antenna transmission. Thus, the antenna configuration may be changed such that the antenna 155 is no longer being used by the first communication functionality. Although the antenna 150 may still be affected by the coexistence issue for receiving, the antenna 155 may no longer be affected and have an increased performance for receiving.

In a third use case, the UE may again include three antennas in a substantially similar configuration as the second use case. In the third use case, a first communication functionality may utilize a one-antenna transmission that impacts one of the two receiving antennas of a second communication functionality. Specifically, the one-antenna transmission of the first communication functionality may be performed by the antenna 160 while the antennas 150, 155 may be used as the receiving antennas of the second communication functionality. Specifically, the antenna 150 may be the affected antenna due to the first communication functionality.

Given this basis, the selecting application 175 may utilize the selection table 180 and determine a change to be made to this current antenna configuration to improve the performance of the communication functionalities such that the coexistence condition may be minimized. The selection table 180 may indicate that the change includes the second communication functionality altering from the two-antenna reception to a one-antenna reception. Thus, the antenna configuration may be changed such that the antenna 160 is still used in the one-antenna transmission for the first communication functionality. However, the antenna 150 is no longer used in the receiving by the second communication functionality and only the antenna 155 is used for this purpose. The network conditions and performance metrics may also be used to determine that the dual receiving performance is worse than a single clean receiving performance. Accordingly, this selecting application 175 may utilize this change.

In a fourth use case, the UE may again include three antennas in a substantially similar configuration as the second use case. In the fourth use case, a first communication functionality may utilize a one-antenna transmission that impacts one of the two receiving antennas of a second communication functionality. The second communication functionality may also have a one-antenna transmission being performed. Specifically, the one-antenna transmission of the first communication functionality may be performed by the antenna 155 with the one-antenna transmission of the second communication functionality may also be performed by the antenna 155. The antennas 150, 155 may be used as the receiving antennas of the second communication functionality. Specifically, the antenna 155 may be the affected antenna due to the first communication functionality.

Given this basis, the selecting application 175 may utilize the selection table 180 and determine a change to be made to this current antenna configuration to improve the performance of the communication functionalities such that the coexistence condition may be minimized. The selection table 180 may indicate that the change includes the second communication functionality altering from the two-antenna reception to a one-antenna reception. Thus, the antenna configuration may be changed such that the antenna 150 is still used for the reception. The transmission for both the first and second communication functionalities may be maintained. Again, the network conditions and performance metrics may be used to determine that the dual receiving performance is worse than a single clean receiving performance. Accordingly, this selecting application 175 may utilize this change.

In a fifth use case, the UE may include four antennas in a substantially similar manner as the UE 100. In the fifth use case, a first communication functionality may utilize a two-antenna transmission and a two-antenna reception while a second communication functionality may also utilize a two-antenna transmission and a two-antenna reception. The two-antenna transmission/reception of the first communication functionality may impact the transmission/reception of the second communication functionality. The two-antenna transmission of the first communication functionality may be performed by the antennas 160, 165 and the two-antenna reception may also be performed by the antennas 160, 165. The two-antenna transmission of the second communication functionality may be performed by the antennas 150, 155 and the two-antenna reception may also be performed by the antennas 150, 155.

Given this basis, the selecting application 175 may utilize the selection table 180 and determine a change to be made to this current antenna configuration to improve the performance of the communication functionalities such that the coexistence condition may be minimized. The selection table 180 may indicate that the change includes disabling the two-antenna transmission to a one-antenna transmission of either the first or second communication functionality. This may effectively result in a common solution as the second use case. Similarly, the selection table 180 may indicate that the change includes disabling the two-antenna transmission to a one-antenna transmission of both the first and second communication functionalities. This may effectively result in a common solution as the fourth use case.

Figure 5:
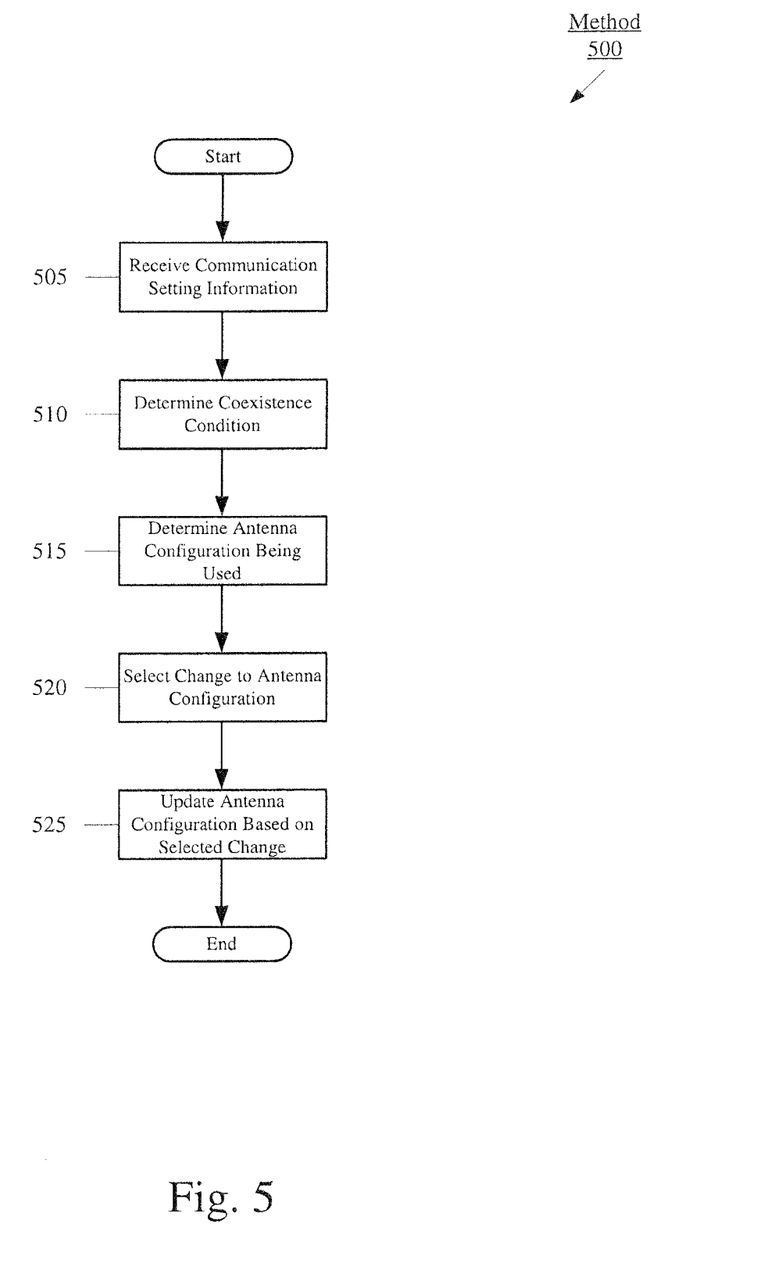
FIG. 5 an exemplary method of selecting an antenna configuration according to various embodiments described herein.

FIG. 5 illustrates an exemplary method 500 of selecting an antenna configuration according to various embodiments described herein. Specifically, the method 500 may relate to determining an antenna configuration to be used based upon the communication functionalities experiencing a coexistence condition. The method 500 also relates to determining a manner in which the transmission and reception is to be performed using the available antennas for the communication functionalities. Specifically, this may relate to utilizing a MIMO configuration or a single-input and single-output (SISO). The method 500 will be described with regard to UE 100 of FIG. 1 and the antenna configurations of FIG. 4.

In 505, the ISM chip 130 may receive the communication setting information. Again, this may entail receiving the ioctl from the decision application 170 executed by the application processor 105 over the PCIe 145 and the Type 7 message from the WCI module 125 of the cellular chip 120 over the WCI pathway 140. In 510, the ISM chip 130 may determine that the current communication settings include a coexistence condition. Accordingly, the cellular chip 120 and the ISM chip 130 may be determined to being used simultaneously.

In 515, the ISM chip 130 may also determine the antenna configuration currently being used. Specifically, the ISM chip 130 may determine the transmission and reception configuration of the antennas such as based upon the ioctl, the Type 7 message, or other mechanism. In 520, the ISM chip 130 selects a change to the antenna configuration. As discussed above, the change to the antenna configuration may be based upon defined changes provided in the selection table 180. The change may also be influenced by performance metrics such as whether a MIMO or a SISO is more optimal. Thus, in 525, the ISM chip 130 updates the antenna configuration based upon the selected change. For example, the ISM chip 130 may generate signals to control the switches to control the manner in which the antennas are used.

As discussed above, the selection table 180 may also include information to define the antenna configurations to be used when the coexistence condition is detected. For example, this portion of the selection table 180 may include a portion for antenna transmission in a coexistence condition. The problem statement that is defined for this portion may be that the transmission antenna(s) impacts the receiving antennas under the coexistence condition and/or the cellular transmission with WiFi or Bluetooth MIMO transmission mixing IMD impacts the cellular reception antennas. Accordingly, a mitigation path is for the WiFi to use SISO for data and acknowledgements with no MIMO, cyclic delay diversity (CDD), or space time block coding (STBC). This may result in an improved performance under coexistence conditions.

In another example, the selection table 180 may also include a portion for WiFi transmission antenna selection based upon a cellular antenna switching decision. The problem statement that is defined for this portion may be that the two-antenna system of WiFi impacts both the cellular receive antennas under a coexistence condition. The cellular transmission and WiFi or Bluetooth MIMO transmission mixing IMD impacts the cellular reception antennas. The cellular transmission antenna also changes per cellular antenna switching decision and its IMD also impacts changes. Accordingly, a mitigation path is for the FW 135 to have a setting based on network metrics such as the band and cellular antenna to WiFi antenna mapping and add a bit to the Type 7 message in the WCI in a substantially similar manner discussed above. Therefore, a selection in the selection table 180 may be made such as forcing a switch from MIMO to SISO. This may result in an improved performance under coexistence conditions such as in a HotSpot.

The exemplary embodiments provide a device and method to select an antenna configuration based upon a variety of factors associated with a transceiver of a UE. The exemplary embodiments provide a mechanism that incorporates whether a transceiver has more than one communication functionality being used simultaneously and whether this communication functionality is also being used with a cellular functionality. Through determining this aspect as well as whether there is one or more negative conditions, the mechanism utilizes a selection table that defines an antenna configuration to be used under the given information of a current status. The selection table further provides antenna configurations when a particular negative condition is identified such that a transmission and reception configuration is also selected.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Mac platform, MAC OS, iOS, Android OS, etc. In a further example, the exemplary embodiments of the above described method may be embodied as a program containing lines of code stored on a non-transitory computer readable storage medium that, when compiled, may be executed on a processor or microprocessor.

It will be apparent to those skilled in the art that various modifications may be made in the present invention, without departing from the spirit or the scope of the invention. Thus, it is intended that the present invention cover modifications and variations of this invention provided they come within the scope of the appended claims and their equivalent.

What is claimed is:

1. An integrated circuit, comprising:
a first radio configured to communicate using a multi-antenna arrangement;
a second radio configured to communicate using the multi-antenna arrangement;
circuitry to generate a message, wherein the message corresponds to one of the first radio or the second radio;
circuitry to determine whether a coexistence condition is present between the first radio and the second radio; and
circuitry to select a first antenna configuration of the multi-antenna arrangement for the first radio and a second antenna configuration of the multi-antenna arrangement for the second radio to be utilized concurrently based on the message when it is determined that the coexistence condition exists.

2. The integrated circuit of claim 1, wherein the first radio is one of a cellular radio, a WiFi radio or a Bluetooth radio.

3. The integrated circuit of claim 1, wherein the second radio is one of a cellular radio, a WiFi radio or a Bluetooth radio.

4. The integrated circuit of claim 1, wherein the coexistence condition is present when the first radio and the second radio are being used simultaneously.

5. The integrated circuit of claim 1, wherein the first antenna configuration and the second antenna configuration are further selected based on information received from an input/output control (ioctl).

6. The integrated circuit of claim 5, wherein the ioctl information is further used to select independent antennas for uplink and downlink in the multi-antenna arrangement.

7. The integrated circuit of claim 1, wherein the first antenna configuration and the second antenna configuration are further selected based on a selection table.

8. The integrated circuit of claim 7, wherein the selection table comprises the multi-antenna arrangement for a single-input and single-output (SISO) antenna arrangement, a cyclic delay diversity (CCD) antenna arrangement or a space time block coding (STBC) antenna arrangement.

9. The integrated circuit of claim 1, wherein the first antenna configuration and the second antenna configuration are further selected based on performance metrics.

10. An integrated circuit, comprising circuitry, wherein the circuitry is configured to:
receive a first indication that a first communication functionality is being used, the first communication functionality utilizing at least one antenna in a multi-antenna arrangement;
determine whether a co-existence condition is present between the first communication functionality and a second communication functionality;
generate a message, wherein the message corresponds to one of the first communication functionality or the second communication functionality; and
select a first antenna configuration of the multi-antenna arrangement for the first communication functionality and a second antenna configuration of the multi-antenna arrangement for the second communication functionality to be utilized concurrently based on the message when it is determined that the coexistence condition exists.

11. The integrated circuit of claim 10, wherein the first communication functionality is one of a cellular communication functionality, a WiFi communication functionality or a Bluetooth communication functionality.

12. The integrated circuit of claim 10, wherein the second radio is one of a cellular communication functionality, a WiFi communication functionality or a Bluetooth communication functionality.

13. The integrated circuit of claim 10, wherein the multi-antenna arrangements includes a first antenna, a second antenna and a third antenna.

14. The integrated circuit of claim 13, wherein prior to the determining of whether the co-existence condition is present comprises:
the first communication functionality utilizing a two-antenna transmission, wherein the first and the second antennas are used for transmission; and
the second communication functionality utilizing a one antenna transmission, wherein the first antenna is used for transmission.

15. The integrated circuit of claim 14, further comprising:
the second communication functionality utilizing the first and third antennas for receiving.

16. The integrated circuit of claim 15, wherein the first antenna configuration comprises the first communication functionality alternating from utilizing the two-antenna transmission to a utilizing a one-antenna transmission.

17. The integrated circuit of claim 13, wherein the second antenna configuration comprises the second communication functionality alternating from utilizing a one-antenna reception to utilizing a two-antenna reception.

18. The integrated circuit of claim 10, wherein the selecting the first antenna configuration and the second antenna configuration comprises determining whether to change from a current antenna configuration.

19. Previously Presented A processor configured to:
receive a first indication of whether a first radio is being used;
receive a second indication of whether a coexistence condition is present between the first radio and a second radio;
receive a message, wherein the message corresponds to one of the first radio or the second radio;
determine a first antenna configuration of a multi-antenna arrangement for the first radio and a second antenna configuration of the multi-antenna arrangement for the second radio to be utilized concurrently based on the message and at least one of a first communication functionality, a second communication functionality, the first indication and the second indication; and
configure the multi-antenna arrangement for the determined at least one of the first communication functionality and the second communication functionality based upon the antenna configuration.

20. The processor of claim 19, wherein the first communication functionality is one of a cellular communication functionality, a WiFi communication functionality, or a Bluetooth communication functionality and the second communication functionality is one of a cellular communication functionality, a WiFi communication functionality, or a Bluetooth communication functionality.

* * * * *

UNITED STATES PATENT AND TRADEMARK OFFICE
CERTIFICATE OF CORRECTION

PATENT NO. : 10,206,236 B2
APPLICATION NO. : 15/391953
DATED : February 12, 2019
INVENTOR(S) : Liu et al.

Page 1 of 1

It is certified that error appears in the above-identified patent and that said Letters Patent is hereby corrected as shown below:

In the Claims

1.) Column (21), Line (7):
"cyclic delay diversity (CCD)" should be "cyclic delay diversity (CDD)"

2.) Column (22), Line (10):
"transmission to a utilizing" should be "transmission to utilizing"

3.) Column (22), Line (19):
"Previously Presented A processor" should be "A processor"

Signed and Sealed this
Fourteenth Day of April, 2020

Andrei Iancu
*Director of the United States Patent and Trademark Office*